(12) United States Patent
Ohl et al.

(10) Patent No.: US 11,468,775 B2
(45) Date of Patent: Oct. 11, 2022

(54) TECHNIQUE FOR COMMUNICATION BETWEEN A PARKED VEHICLE BOUNDING A PARKING SPACE AND A VEHICLE TO BE PARKED

(71) Applicant: Elektrobit Automotive GmbH, Erlangen (DE)

(72) Inventors: Sebastian Ohl, Braunschweig (DE); Gerald Klein, Vordorf (DE)

(73) Assignee: ELEKTROBIT AUTOMOTIVE GMBH, Erlangen (DE)

( * ) Notice: Subject to any disclaimer, the term of this patent is extended or adjusted under 35 U.S.C. 154(b) by 0 days.

(21) Appl. No.: 15/677,596

(22) Filed: Aug. 15, 2017

(65) Prior Publication Data

US 2018/0053421 A1    Feb. 22, 2018

(30) Foreign Application Priority Data

Aug. 16, 2016 (DE) .................... 10 2016 009 921.6

(51) Int. Cl.
*G08G 1/16* (2006.01)
*G05D 1/02* (2020.01)
*B60W 30/06* (2006.01)

(52) U.S. Cl.
CPC ............ *G08G 1/168* (2013.01); *B60W 30/06* (2013.01); *G05D 1/028* (2013.01); *G05D 1/0214* (2013.01); *G05D 1/0287* (2013.01); *B60W 2554/801* (2020.02); *B60W 2556/65* (2020.02); *G05D 2201/0213* (2013.01)

(58) Field of Classification Search
CPC .... G08G 1/168; G05D 1/0287; G05D 1/0214; G05D 1/028; G05D 2201/0213; B60W 30/06; B60W 2550/308; B60W 2550/408
See application file for complete search history.

(56) References Cited

U.S. PATENT DOCUMENTS

| | | | | |
|---|---|---|---|---|
| 6,078,946 A | * | 6/2000 | Johnson | .............. H04L 41/0806 709/200 |
| 2004/0095230 A1 | * | 5/2004 | Li | .......................... B67D 7/348 340/426.16 |
| 2007/0127008 A1 | * | 6/2007 | Ash | .......................... F41G 3/02 356/4.01 |
| 2014/0195114 A1 | * | 7/2014 | Tseng | ................... B60G 17/015 701/37 |
| 2015/0039173 A1 | | 2/2015 | Beaurepaire et al. | |
| 2015/0370255 A1 | | 12/2015 | Harvey | |
| 2016/0117927 A1 | * | 4/2016 | Stefan | ................... B60W 30/06 340/932.2 |
| 2016/0189435 A1 | * | 6/2016 | Beaurepaire | ........... G05D 1/021 705/13 |
| 2016/0231133 A1 | * | 8/2016 | Johnson | .................. G08G 1/143 |
| 2017/0166115 A1 | * | 6/2017 | Pal | .......................... G08G 1/149 |

(Continued)

FOREIGN PATENT DOCUMENTS

| CN | 101444003 | 5/2009 |
|---|---|---|
| CN | 102039893 | 5/2011 |

(Continued)

*Primary Examiner* — Rodney A Butler
(74) *Attorney, Agent, or Firm* — Cozen O'Connor (57) ABSTRACT

A device for communication between a parked vehicle bounding a parking space and a vehicle to be parked includes a transceiver configured to transmit at least one vehicle-specific minimum distance from the parked vehicle to the vehicle to be parked.

9 Claims, 5 Drawing Sheets

(56) References Cited

U.S. PATENT DOCUMENTS

2017/0330460 A1\* 11/2017 Massey ................. G08G 1/149
2018/0025641 A1\* 1/2018 LaVelle ................. G08G 1/143
340/932.2

FOREIGN PATENT DOCUMENTS

DE     10 2014 210 043 A1    10/2015
DE        102014219876      4/2016
EP            2072364 A2 \*   6/2009    ...... B62D 15/0285

\* cited by examiner

TECHNIQUE FOR COMMUNICATION BETWEEN A PARKED VEHICLE BOUNDING A PARKING SPACE AND A VEHICLE TO BE PARKED

BACKGROUND OF THE INVENTION

1. Field of the Invention

The present disclosure relates to communication between a parked vehicle bounding a parking space and a vehicle to be parked.

2. Description of the Related Art

Parking assistance systems are becoming increasingly widespread in motor vehicles. Established parking assistance systems range from simple parking distance sensors to systems for automatic parking processes that involve the driver of the vehicle to be parked now monitoring the parking process only with a dead man's switch.

Even with simple parking assistance systems, it is possible to perform parking maneuvers that are otherwise possible only with guidance by a second person. By way of example, a parking distance sensor at the front/rear or on the left/right can be used to drive very close to a parked vehicle. If this is done from both sides of the already parked vehicle, then this vehicle can no longer get out of its parking space.

New types of parking assistance systems already permit remote control of the vehicle to be parked. In such systems, the driver of the vehicle to be parked can get out and use a remote control to move his vehicle forward and backward by a few vehicle lengths. The vehicle then also drives into parking spaces from which the driver or the passengers would no longer be able to get out. Taking the vehicle out of its parking space is performed in the same way using the remote control. A disadvantage is that the driver of an adjacent, already parked vehicle is no longer able to get in if his vehicle does not have a remote control system of this kind. There is thus the risk of newer vehicles with modern parking assistance systems "blocking in" vehicles without such systems.

The problem of blocking in can also arise without parking assistance if the driver of the parking vehicle drives too close to the already parked vehicle. This is very much dependent on the capabilities of the respective driver and particularly on the estimated distance from the parked vehicle. In the worst case, the driver of the blocked-in vehicle has to accept relatively long waiting times or notify a vehicle recovery service in order to access his vehicle.

DE 10 2014 210 043 A1 describes a method and a parking assistant for parking a vehicle in a perpendicular parking space along a parking trajectory. This first of all involves the position of the steering wheel of the parking vehicle and the direction of parking thereof being ascertained. On the basis of this information, the driver's side of the parking vehicle is determined. A target parking position for the vehicle to be parked in the perpendicular parking space is then ascertained by taking account of a defined safe distance for opening a driver's door of the vehicle to be parked and for opening the driver's door of the parked vehicle.

However, this parking system has the disadvantage that the safety distance for opening the driver's door may be too short for the already parked vehicle. Owing to the numerous vehicle types and the attendant vehicle-specific gaps for getting in and out there are a resultant multiplicity of different safety distances that the parking assistant would need to know and associate with the respective vehicle type. Taking account of a defined safety distance and determining a potentially necessary gap for getting in and out therefore hold the risk of the already parked vehicles still being blocked in by the vehicle to be parked. On the other hand, there is always a need to make the best possible use of the available space.

SUMMARY OF THE INVENTION

It is therefore an object of the invention to provide a technique for communication between a parked vehicle bounding a parking space and a vehicle to be parked that prevents the parked vehicle from being obstructed.

In accordance with a first aspect, a device for communication between a parked vehicle bounding a parking space and a vehicle to be parked is provided, wherein the device is designed to permit a transmission of at least one vehicle-specific minimum distance from the parked vehicle to the vehicle to be parked.

The device may particularly be contained in the parking vehicle. The device may, by way of example, be configured for vehicle-to-vehicle communication (also called car-to-car communication). The transmission can comprise sending or otherwise signaling the vehicle-specific minimum distance.

The vehicle-specific minimum distance can relate to a parameter of the parked vehicle. This distance may be a vehicle-specific minimum parking distance for opening a driver's door of the parked vehicle. Alternatively or additionally, the vehicle-specific minimum distance may be a distance needed for taking the parked vehicle out of its parking space.

In accordance with one variant, the communication device can further permit the transmission of a position of a vehicle side having a driver's door of the parked vehicle from the parked vehicle to the vehicle to be parked. The position can be signaled absolutely (e.g., as a GPS coordinate) or relatively (e.g., with respect to the vehicle to be parked).

The communication device can have a transmitter, particularly a radio signal transmitter and/or an optically active or passive transmitter. The transmitter may be configured to transmit at least the vehicle-specific minimum distance to the vehicle to be parked (in order to permit reception-end ascertainment thereof).

By way of example, the radio signal transmitter may be a radio transmitter configured to send the vehicle-specific minimum distance to the vehicle to be parked. The optically active transmitter can have one or more light-emitters, for example a light-emitting diode (LED). The light-emitting diode may be a diode emitting in the infrared range. A specific emitted signal sequence may be associated with a vehicle-specific minimum distance. The optically passive transmitter may be, by way of example, a marking installed on the vehicle.

In accordance with a second aspect, a device for communication between a vehicle to be parked and a vehicle bounding a parking space or a remote system is specified, wherein the device is configured to receive a transmission of a vehicle-specific minimum distance for the parked vehicle on the vehicle to be parked.

The communication device in accordance with the second aspect may particularly be contained in the vehicle to be parked. It can be integrated with the communication device in accordance with the first aspect to form a single device.

The communication device in accordance with the second aspect can comprise an output configured to output at least the minimum distance to the driver and/or to a driver assistance system of the vehicle to be parked. In accordance with one option, the communication device may be configured to output a previously defined safety distance as minimum distance by the output when no vehicle-specific minimum distance can be or has been recorded from the parked vehicle (e.g., because the parked vehicle is not equipped with a complementary communication device in accordance with the first aspect).

In one implementation the communication device in accordance with the second aspect can comprise an evaluator configured to compare information transmitted by the parked vehicle or for the parked vehicle with content of an internal or external database. To this end, the communication device can have a corresponding data transmission interface, for example a radio, that is suitable for sending fee information to a receiver of a remote system. The receiver can forward the transmitted information to a computer or a server of the system that compares the information with content of the database. The computer can then transmit the result back to the communication device by a transmitter of the system.

By way of example, the information can comprise the registration number or the type of the parked vehicle. The registration number can then be matched against a registration list stored in the database. This database may also contain data registered for automatically parking vehicles. Additionally or alternatively, the database can indicate the vehicle-specific minimum distance for the respective registration number or vehicle type. The computer can, for example using a radio device, send the vehicle-specific minimum distance selected on the basis of specific registration number or specific type to the communication device of the vehicle to be parked. The communication device may therefore be configured to query the vehicle-specific minimum distance from an internal or external database based on the information obtained from the parked vehicle.

The communication device in accordance with the second aspect can have a recorder, particularly a radio signal recorder and/or an optical recorder. The recorder may be configured to record information transmitted by the parked vehicle. The information can comprise the vehicle-specific minimum distance or permit ascertainment thereof.

By way of example, the radio signal recorder may be a radio receiver configured to receive radio signals sent by the parked vehicle. The optical recorder may comprise a camera. The camera may be mounted in the vehicle or installed on the bodywork. The camera may be configured to recognize information such as a marking, for example a sticker, symbols, characters, a type designation or the registration number of the vehicle. The marking can have vehicle-specific symbols or characters. The symbols or characters may already be or can be associated with a vehicle-specific minimum distance, for example (e.g., using the internal or external database).

An optically passive transmitter can have one or more symbols or characters. The symbols or characters may have been put on a sticker or directly (for example painted on or sprayed on) on the parked vehicle. The symbols or characters may already be or cart be associated with a vehicle-specific minimum distance (e.g., using the internal or external database).

In accordance with one variant the communication device in accordance with the second aspect can have a signal output configured to output a signal to the parked vehicle. The signal output may be a transmitter for outputting a radio signal or optical signal. The communication device may be configured to assess whether or not the parked vehicle can provide information (e.g., the vehicle-specific minimum distance of the parked vehicle). To this end, the communication device may be configured to request and/or receive a signal from the parked vehicle. Recognition can be effected, by way of example, such that the parked vehicle responds (Response) or does not respond to a signal output by the vehicle to be parked (Request). This has the advantage that no upgrades are needed in order to recognize conventional vehicles.

The communication device in accordance with all the aspects presented here can have a short-range radio unit. By way of example, the short range radio may be implemented with Bluetooth. In one implementation, the communication device can include a wireless local area network. The wireless network may be implemented with IEEE 802.11p. Alternatively or additionally, the communication device can comprise a car-to-car communicator. These radios, networks and communicators may respectively be designed to implement the transmission between the parked vehicle and the vehicle to be parked. In one variant, the communication device can have two or more of these radios, networks or communicators.

In accordance with a further aspect, a driver assistance system is provided. The driver assistance system can comprise the communication device in accordance with the first and/or second aspect that is described here. The driver assistance system can further comprise a controller that determines a parking trajectory to be traveled at least semi-autonomously by the vehicle to be parked by taking into consideration the minimum distance communicated by the parked vehicle.

In one variant, the driver assistance system may be configured not to give clearance for a parking process when the minimum distance communicated by the parked vehicle is not present. For this purpose, the vehicle-specific minimum distance can be compared with, an actually existing distance or a prescribed minimum distance. The actually existing distance can be ascertained (e.g., by sensor) by the vehicle to be parked.

In accordance with a further aspect, a vehicle is provided. The vehicle may be equipped with the communication device in accordance with the first and/or second aspect that is described here. Alternatively or additionally, the vehicle may be equipped with the driver assistance system described here.

In accordance with another aspect, a vehicle is provided, wherein the vehicle is equipped with a communication device for sending information to a parking vehicle, the device being configured to permit sending of a vehicle-specific minimum distance from the vehicle to the parking vehicle. In accordance with a further aspect, a vehicle is provided, wherein the vehicle is equipped with a communication device for receiving information from a parked vehicle and wherein the device is configured to permit reception of a vehicle-specific minimum distance from the parked vehicle.

In accordance with another aspect, a vehicle is provided, wherein the vehicle is equipped with a driver assistance system for determining a parking trajectory to be traveled at least semi-autonomously by the vehicle, the driver assistance system being configured not to give clearance for a parking process or else to perform a parking process with a previously defined safety distance as minimum distance from a parked vehicle when there is no communication device for sending or receiving information, particularly a vehicle-specific minimum distance.

In accordance with a further aspect, a method for communication between a parked vehicle hounding a parking space and a vehicle to be parked is provided, wherein the method comprises at least the following step; permitting transmission of a vehicle-specific minimum distance from the parked vehicle to the vehicle to be parked.

Moreover, in accordance with a further aspect, a method for communication between a parked vehicle hounding a parking space or a remote system and a vehicle to be parked is provided, wherein the method comprises at least the following step: receiving a transmission of a vehicle-specific minimum distance for the parked vehicle on the vehicle to be parked.

Further, a computer program in a non-transitory computer-readable medium is specified that comprises program code configured to prompt the performance of one of the methods presented here on a processor when the program is executed on the processor. The processor may be part of a vehicle controller.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further aspects, features and advantages of the present disclosure will emerge from the exemplary embodiments explained below and from the schematic figures, in which.

DETAILED DESCRIPTION OF THE PRESENTLY PREFERRED EMBODIMENTS

Several exemplary embodiments are explained by way of example below. Matching or comparable elements are provided with the same reference symbols.

Figure 1:
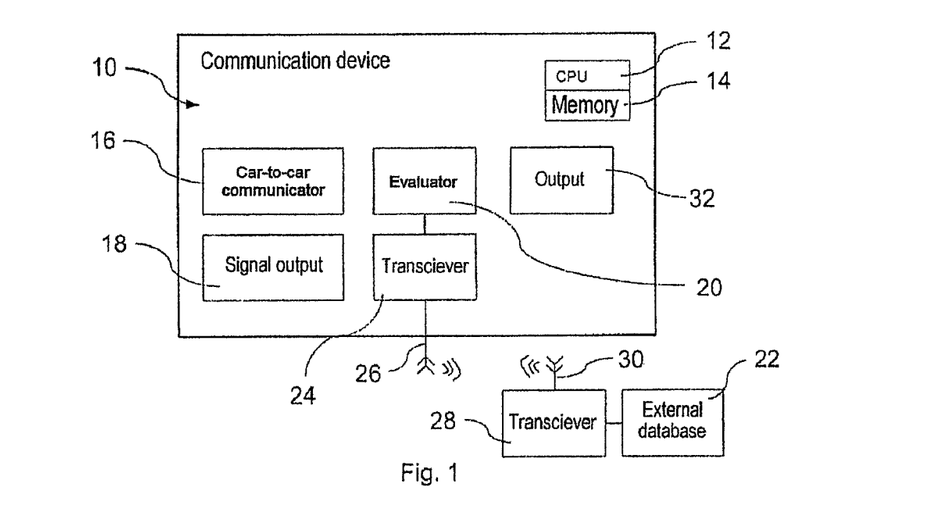
FIG. 1 schematically shows an exemplary embodiment of a vehicle communication device for receiving information from another vehicle.

FIG. 1 schematically depicts a first exemplary embodiment of a communication device 10. The communication device 10 is configured to set up and perform a communication between one or more parked vehicle(s) bounding a parking space and a vehicle to be parked (not depicted in FIG. 1). The communication device 10 is installed in the vehicle to be parked.

The communication device 10 permits reception of a vehicle-specific minimum distance for the parked vehicle(s) on the vehicle to be parked. The vehicle-specific minimum distance may be the minimum parking distance for opening a driver's door of the parked, vehicle or the distance needed for taking the parked vehicle out of its parking space. The communication device 10 may further be designed to permit the transmission of the position of a vehicle side having a driver's door of the parked vehicle from the parked vehicle to the vehicle to be parked.

The communication device 10 has a processor 12 (central processing unit/CPU). The processor 12 controls the individual components and functions of the communication device 10 by appropriate instructions and/or program sequences. The processor 12 can access a memory 14, for example a volatile or non-volatile memory such as a permanent memory, and retrieve and/or store information therefrom/therein.

As depicted in FIG. 1, the communication device 10 has a car-to-car communicator 16. The car-to-car communicator 16 is configured to implement a data transmission between the parked vehicle and the vehicle to be parked. The car-to-car communicator 16 can set np a communication between two vehicles (e.g., without the interposition of other communication nodes such as a base station of a mobile radio network) and interchange information, for example the vehicle-specific minimum distance, between the participating vehicles by radio (e.g., WLAN, UMTS, LTE, 5G, etc.). To this end, the ear-to-car communicator 16 can set up a communication link to a complementary car-to-car communicator of the other vehicle (not depleted). In the present exemplary embodiment, the car-to-car communicator 16 is configured to receive the vehicle-specific minimum distance from another vehicle.

The communication device 10 can also comprise a short-range radio, preferably implemented with Bluetooth, or a unit of a wireless network, preferably implemented with IEEE 802.11p or the like, which are respectively designed to allow the transmission between two vehicles.

The communication device 10 further has a signal output 18. The signal output 18 can output a signal to the other (e.g., parked) vehicle at the request or command of the processor 12. This signal may be a radio signal or an optical signal. The signal output 18 may therefore be a transmitter for outputting a radio signal or optical signal.

The communication device 10 can, in accordance with one variant, take an acknowledgement in response to the signal from the other vehicle as a basis for assessing whether or not the other vehicle can provide desired information (particularly the vehicle-specific minimum distance of said other vehicle). To this end, the communication device 10 is configured to receive a response signal (Response) from the other vehicle in response to a request signal (Request). The acknowledgement information from the other vehicle received (or not received) in response to the request signal is processed in the processor 12 and assessed accordingly. Recognition can be effected, by way of example, such that the other vehicle responds or does not respond to a signal output by the vehicle to be parked. This has the advantage that no upgrades are necessary in order to recognize conventional vehicles.

The communication device 10 can also receive further information, or information other than the vehicle-specific minimum distance, from the other vehicle (e.g., a vehicle type, the registration number of the vehicle a particular numerical and/or letter sequence, etc.). In order to be able to process this information, the communication device 10 has an evaluator 20. The evaluator 20 is configured to evaluate the information transmitted by the parked vehicle or for the parked vehicle. For this purpose, the evaluator 20 can communicate with a database 22. The database 22 is, in the present exemplary embodiment, an external database 22, i.e., a database that does not exist in the communication device 10 or in the vehicle. Alternatively or additionally, the database may also be implemented as an internal database, i.e., one that exists in the communication device 10 or the vehicle.

The evaluator 20 transmits the information to the external database 22 by a transceiver 24 of the communication device 10. The transceiver 24 has an antenna 26. The transceiver 24 can communicate and interchange data with an external transceiver 28 by the antenna 26. The external transceiver 28 is connected to the database 22. For the purpose of sending and receiving data, the transceiver 28 likewise has an antenna 30.

The evaluator 20 can therefore access an external database 22 and compare the information transmitted by the other vehicle or otherwise (e.g., by a camera) received for the other vehicle with content of the database 22. Usually, the content of the database 22 is stored in a list format. In particular, the information is compared with associated information in the database 22, the associated information being associated with a vehicle-specific minimum distance. As such, by way of example, the vehicle type or the registration number can be used to ascertain the vehicle-specific minimum distance for the other vehicle. The transceiver 28 is then used to transmit this vehicle-specific minimum distance to the evaluator 20. The evaluator 20 processes this vehicle-specific minimum distance in the communication device 10 accordingly and/or forwards it, for example to the processor 12 and/or to an output 32 of the communication device 10.

The output 32 receives at least the vehicle-specific minimum distance of the other vehicle from the car-to-car communicator 16, the processor 12 or from the evaluator 20. The output 32 is configured to output at least the minimum distance to the driver and/or to a driver assistance system (not depicted in FIG. 1) of the vehicle to be parked. The output to the driver is effected via suitable structure, such as a display apparatus, on top of, on or in proximity to the dashboard or via a head up display. A head up display projects the information onto the windshield of the vehicle. The output to the driver assistance system is effected via appropriate communication lines or by radio transmission.

When no vehicle-specific minimum distance can be recorded or received from the other (parked) vehicle, the communication device 10 can resort to a previously defined safety distance existing in the memory 14 as minimum distance. This safety distance can be output by the communication device 10 to the driver and/or to the driver assistance system by the output 32, as described above.

Figure 2:
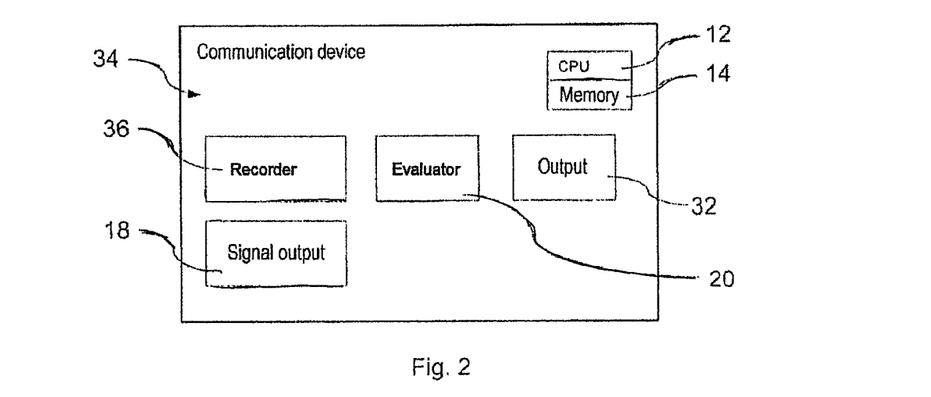
FIG. 2 schematically shows a further exemplary embodiment of a vehicle communication device for receiving information from another vehicle.

FIG. 2 schematically shows a further exemplary embodiment of a communication device 34 in accordance with FIG. 2, which essentially corresponds to the communication device 10 in accordance with FIG. 1. The difference between the communication device 34 and device 10 in accordance with FIG. 1 is that a recorder 36 is provided instead of the car-to-ear communicator 16. All other components and characteristics, such as CPU 12, memory 14, signal output 18, evaluator 20, output 32, etc., of the communication device 34 essentially correspond to the components and characteristics of the communication device 10 that are described above. For the sake of clarity, the depiction of the transceiver 24, antenna 26, transceiver 28, antenna 30 and internal/external database 22 has been dispensed with in FIG. 2. These components could likewise be provided in the communication device 34 in accordance with FIG. 2, however. The communication device 34 is installed at least in the vehicle to be parked.

The recorder 36 of the communication device 34 is configured to record at least one vehicle-specific minimum distance at the vehicle to be parked. The recorder 36 may be a radio signal recorder and/or an optical recorder. The recorder 36 is, in the present exemplary embodiment, configured to record the information transmitted by the other (e.g., parked) vehicle. The information can include the vehicle-specific minimum distance.

By way of example, the radio signal recorder may be a radio receiver that is configured to receive radio signals sent by the other vehicle. The optical recorder may be a camera. The camera may be mounted in the vehicle or installed on the bodywork (not depicted in FIG. 2). The camera is configured to recognize a type or a marking, for example a sticker, symbols, characters or the registration number of the vehicle. The sticker can have vehicle-specific symbols or characters. The symbols or characters may be associated with a vehicle-specific minimum distance. The information recorded by the recorder 36 is forwarded to the evaluator 20. The evaluator 20 compares, as described above with reference to FIG. 1, this information with content of the internal or external database 22 and evaluates the result. The evaluator 20 thereby determines at least the vehicle-specific minimum distance. This minimum distance is then forwarded to the processor 12 and/or the output 32.

Figure 3:
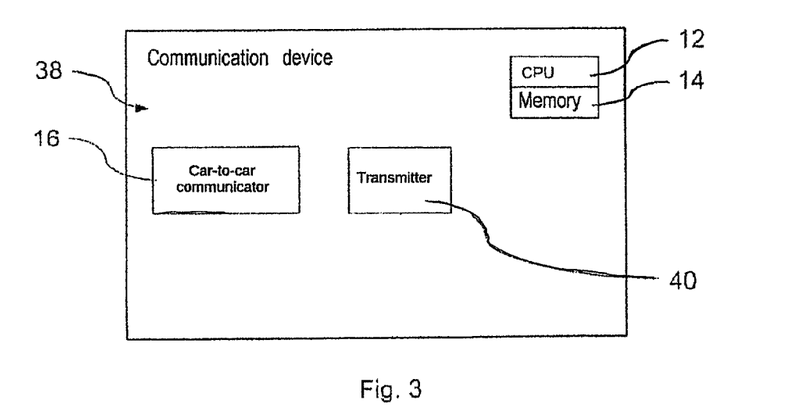
FIG. 3 schematically shows a further exemplary embodiment of a vehicle communication device for sending information to another vehicle.

FIG. 3 schematically shows a further exemplary embodiment of a communication device 38. The communication device 38 is installed in a parked vehicle.

The communication device 38 has a processor 12 and a memory 14, as described above. Further, the communication device 38 has the car-to-car communicator 16 and/or one of the alternative communicators described, in order to communicate with a vehicle to be parked.

The communication device 38 has, in the present exemplary embodiments a transmitter 40. The transmitter 40 is a radio signal transmitter and/or an optically active or passive transmitter. The transmitter 40 is configured to transmit at least the vehicle-specific minimum distance to the vehicle to be parked.

By way of example, the radio signal transmitter may be a radio transmitter that is configure to send the vehicle-specific minimum distance to the vehicle to be parked. The optically active transmitter can have one or more light-emitters, for example a light-emitting diode (LED). The light-emitting diode may be a diode emitting in the infrared range. A specific emission sequence can in this case be associated with a vehicle-specific minimum distance. The optically passive transmitter can have one or more symbols or characters. The symbols or characters may have been put on a sticker or directly (for example painted on or sprayed on) on the vehicle and/or the communication device 38. The symbols or characters can be associated with a vehicle-specific minimum distance.

Figure 4:
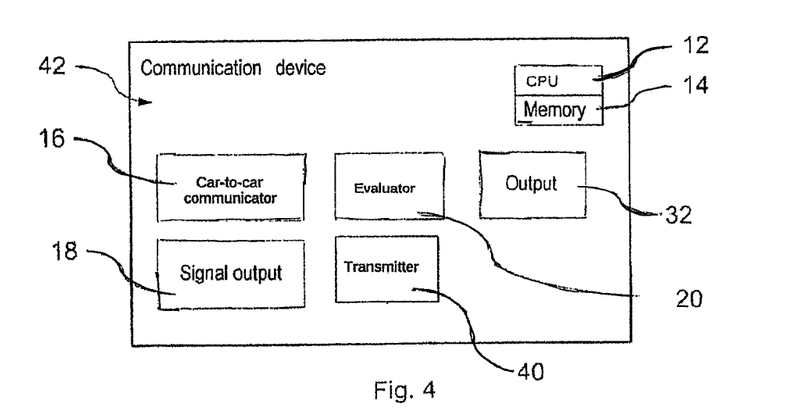
FIG. 4 schematically shows a further exemplary embodiment of a vehicle communication device for receiving information from another vehicle and for sending information to another vehicle.

FIG. 4 schematically shows a further exemplary embodiment of a communication device 42. The communication device 42 is essentially a combination of the communication device 10 in accordance with FIG. 1 and the communication device 38 in accordance with FIG. 3. The communication device 42 therefore essentially has the components and characteristics described above for the communication devices 10 and 38.

The communication device 42 is configured to permit a transmission of a vehicle-specific minimum distance from the parked vehicle to the vehicle to be parked. In accordance with the present exemplary embodiment, the communication device 42 is particularly configured firstly to receive a vehicle-specific minimum distance from the parked vehicle and secondly to send a vehicle-specific minimum distance to another vehicle.

Figure 5:
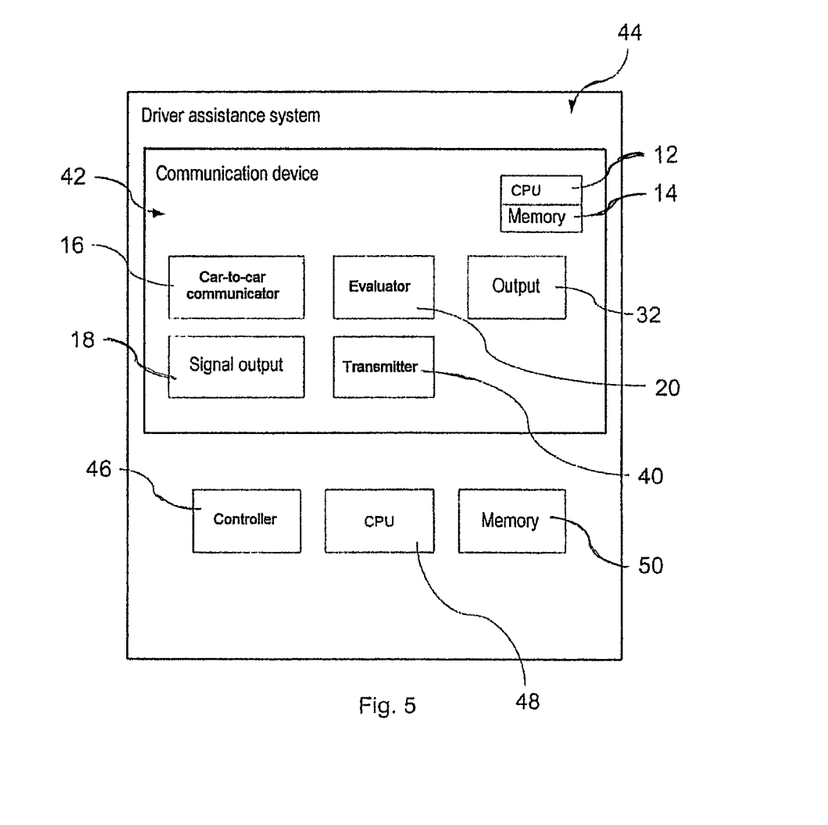
FIG. 5 schematically shows an exemplary embodiment of a driver assistance system having a communication device in accordance with FIG. 4.

FIG. 5 schematically shows an exemplary embodiment of the driver assistance system 44. The driver assistance system 44 comprises the communication device 42 described above with reference to FIG. 4. Alternatively, the driver assistance system 44 can comprise any other communication device described here.

The driver assistance system 44 further has a controller 46 that can communicate with the communication device 42. In order to process information, the driver assistance system 44 has a processor 48 and a memory 50. The processor 48 and the memory 50 are connected to the controller 46 to interchange appropriate instructions and/or data. The controller 46 and the processor 48 can access the memory 50 and retrieve and/or store information therefrom/therein.

The controller 46 is configured to determine a parking trajectory to be traveled at least semi-autonomously by the vehicle to be parked. Use driver assistance system 44, for this purpose, receives from the communication device 42 at least the vehicle-specific minimum distance or a defined safety distance from the parked vehicle. The controller 46 is further configured to determine the parking trajectory to be traveled by taking into consideration the minimum distance communicated by fee parked vehicle or the defined safety distance. On the basis of the parking trajectory computed therewith, the controller 46 of the driver assistance system 44 autonomously or semi-autonomously steers the vehicle to be parked into the selected parting space. The driver assistance system 44 is configured not to give clearance for the parking process when the minimum distance communicated by the parked vehicle or the defined safety distance is not present.

Figure 6:
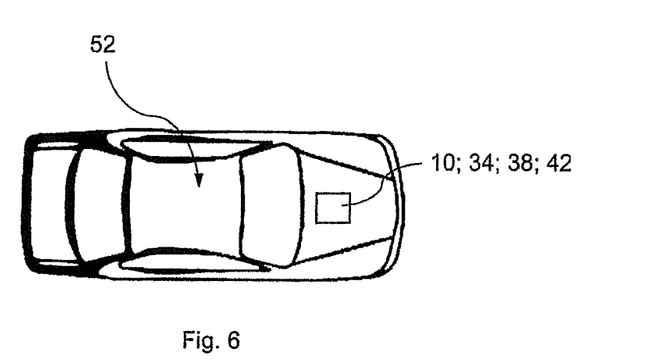
FIG. 6 schematically shows an exemplary embodiment of a vehicle having a communication device or a driver assistance system.

FIG. 6 schematically shows an exemplary embodiment of a vehicle 52. The vehicle 52 is equipped with one of the communication devices 10, 34, 38, 42 described here, in order to receive a vehicle-specific minimum distance from another (e.g. parked) vehicle or a defined safety distance for a parking process of the vehicle 52.

Alternatively or additionally, the vehicle 52 may be equipped with the driver assistance system 44 in accordance with FIG. 5. The driver assistance system 44 can maneuver the vehicle 52 at least semi-autonomously into a parking space along a parking trajectory to be traveled and by taking into consideration the minimum distance from the parked vehicle.

Figure 7:
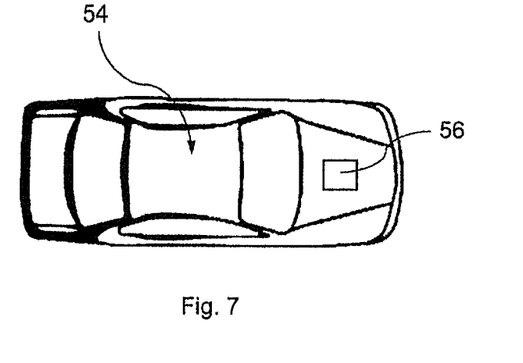
FIG. 7 schematically shows a further exemplary embodiment of a vehicle having a driver assistance system.

FIG. 7 schematically shows a further exemplary embodiment of a vehicle 54. The vehicle 54 has a driver assistance system 56 for determining a parking trajectory to be traveled at least semi-autonomously by the vehicle 52.

The driver assistance system 56 is configured not to give clearance for a parking process or else to perform a parking process with a previously defined safety distance as minimum distance from another/a parked vehicle when there is no communication device for sending and/or receiving information, particularly a vehicle-specific minimum distance.

Figure 8:
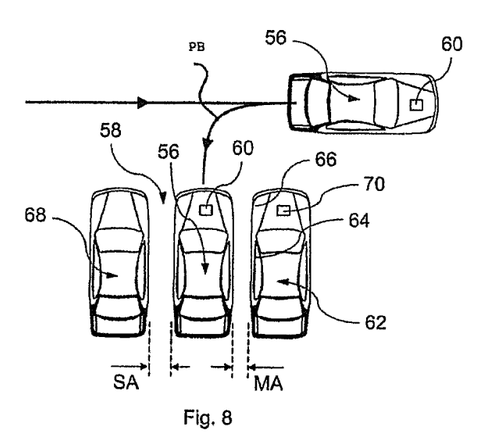
FIG. 8 schematically shows an exemplary embodiment of a parking of a vehicle in a perpendicular parking space.

FIG. 8 schematically shows an exemplary embodiment of parking of a vehicle 56 in a perpendicular parking space 58.

The vehicle 56 to be parked has a communication device 60 that is configured to receive information from a parked vehicle 62. The communication device 60 is configured to permit reception of a vehicle-specific minimum distance MA from the parked vehicle 62. The vehicle-specific minimum distance may be the minimum parking distance MA for opening a driver's door 64 of the parked vehicle 62 or the distance MA needed for taking the parked vehicle 62 out of its parking space. The communication device 60 is further configured to permit the transmission of the position of a vehicle side 66 having the driver's door 64 of the parked vehicle 62 from the parked vehicle 62 to the vehicle 56 to be parked. In one implementation, the communication device 60 corresponds to the communication device 10, 34, 38, 42 described with reference to FIGS. 1 to 5.

The parked vehicle 62 has a communication device 70 that is configured to send information to the vehicle 56 to be parked. The communication device 70 is specifically configured to permit a transmission of the vehicle-specific minimum distance MA from the parked vehicle 62 to the parking vehicle 56. The communication device 70 is further configured to permit the transmission of the position of the vehicle side 66 having the driver's door 64 of the parked vehicle 62 from the parked vehicle 62 to the vehicle 56 to be parked. In the present exemplary embodiment, the communication device 70 essentially corresponds to the communication device 38 or 42 described with reference to FIG. 3 or FIG. 4. Alternatively, the communication device 70 can also correspond to any other communication device described here that is suitable for transmitting information to another vehicle.

As can be seen in FIG. 8, the perpendicular parking space 58 is bounded on one side (on foe right-hand side in FIG. 8) by the parked vehicle 62. The perpendicular parking space may additionally or alternatively be bounded by another vehicle 68 on the other side (on the left-hand side in FIG. 8). This other vehicle 68 can, but does not have to, have one of the communication devices described here. In the present exemplary embodiment, the vehicle 68 has no communication device. In this case, the communication device 60 of the vehicle 56 to be parked therefore cannot receive a vehicle-specific minimum distance from the parked vehicle 68. The communication device 60 therefore either determines, as described above with reference to FIG. 1, a safety distance SA or obtains the vehicle-specific minimum distance for the parked vehicle 68 from a database (e.g., using a type of the vehicle 68 that is recognized by a camera and image evaluation).

The vehicle 56 to be parked further has a driver assistance system for determining a parking trajectory PB to be traveled at least semi-autonomously by the vehicle 56. The driver assistance system can essentially correspond to one of the driver assistance systems described here, for example the driver assistance system 44 described with reference to FIG. 5.

The driver assistance system of the vehicle 56 to be parked determines the parking trajectory PB to be traveled by taking into consideration the minimum distance MA communicated by the parked vehicle 62. The driver assistance system is also configured to perform the parking process with a previously defined safety distance SA as minimum distance when no vehicle-specific minimum distance can be or has been recorded from the parked vehicle, in the present exemplary embodiment from vehicle 68. Further, the driver assistance system is configured not to give clearance for the parking process when the minimum distance MA communicated by the parked vehicle 62 or the determined safety distance SA would not be present.

Figure 9:
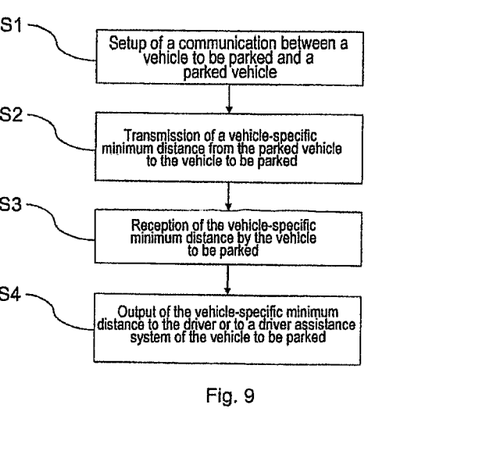
FIG. 9 schematically shows a flowchart for the performance of a communication between two vehicles.

FIG. 9 is a flowchart that schematically shows an exemplary embodiment of a method for performing a communication between two vehicles.

In the simplest case, the vehicle-specific minimum distance from the parked vehicle is received or otherwise ascertained by the vehicle to be parked (i.e., by the communication device thereof). This vehicle-specific minimum distance is then output to the driver or to a driver assistance system of the vehicle to be parked.

By way of example, as depicted in FIG. 9, a first step S1 involves a communication being set up between the vehicle to be parked and the parked vehicle. A further step S2 involves the vehicle-specific minimum distance being sent from the parked vehicle to the vehicle to be parked. A step S3 then involves the minimum distance sent by the parked vehicle being received by the vehicle to be parked. A step S4 then involves the received vehicle-specific minimum distance being output to the driver or to a driver assistance system of the vehicle to be parked.

The method depicted in FIG. 9 can be combined with all further exemplary embodiments described here.

The above description of the exemplary embodiments is merely exemplary in nature and does not restrict the invention defined in the patent claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shows and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device for communication between a parked vehicle bounding a parking space and a vehicle to be parked, comprising:
    a transceiver configured to transmit at least one vehicle-specific distance needed for taking the parked vehicle out of its parking space from the parked vehicle to the vehicle to be parked,
    wherein the transceiver is configured to transmit the at least one vehicle-specific distance via passive optical transmission.

2. The device as claimed in claim 1, wherein the vehicle-specific distance needed for taking the parked vehicle out of its parking space is a minimum parking distance for opening a driver's door of the parked vehicle.

3. The device as claimed in claim 1, wherein the transceiver is configured to transmit a position of a vehicle side having a driver's door of the parked vehicle from the parked vehicle to the vehicle to be parked.

4. A device for communication between a vehicle bounding a parking space or a remote system and a vehicle to be parked, comprising:
    a transceiver configured to receive a transmission of a vehicle-specific distance needed for taking the parked vehicle out of its parking space from the parked vehicle to the vehicle to be parked, at least a portion of the received transmission having been transmitted by passive optical transmission; and
    an output configured to output at least the vehicle-specific distance to the driver and to a driver assistance system of the vehicle to be parked,
    wherein the driver assistance system at least semi-autonomously maneuvers the vehicle to be parked into a parking space based at least in part on the received passive optical transmission.

5. The device as claimed in claim 4, wherein the output is configured to output a previously defined safety distance as distance needed for taking the parked vehicle out of its parking space when no vehicle-specific distance can be or has been recorded from the parked vehicle or for the parked vehicle.

6. The device as claimed in claim 5, further comprising an evaluator configured to compare information transmitted by the parked vehicle, or for the parked vehicle, with content of an internal or an external database.

7. The communication device as claimed in claim 6, further comprising a recorder configured to record information transmitted by the parked vehicle.

8. The device as claimed in claim 7, further comprising a signal output configured to output a signal to the parked vehicle, wherein the communication device is configured to assess whether or not the parked vehicle can provide information.

9. The device as claimed in claim 1, further comprising, for implementing the transmission between the parked vehicle and the vehicle to be parked, at least one selected from the group of: a short-range radio unit, a unit of a wireless local area network and a car-to-car communicator.

* * * * *